United States Patent
Aratani et al.

(10) Patent No.: US 7,085,666 B2
(45) Date of Patent: Aug. 1, 2006

(54) MAGNETIC HEAD TESTING APPARATUS

(75) Inventors: Taketoshi Aratani, Atsugi (JP);
Tetsuya Mukunoki, Kawasaki (JP);
Kazuteru Hashizume, Yokohama (JP);
Takao Sugawara, Isehara (JP);
Kiyoharu Yagyu, Kowloon (HK)

(73) Assignee: Fujitsu Limited, Kawasaki (JP)

( * ) Notice: Subject to any disclaimer, the term of this patent is extended or adjusted under 35 U.S.C. 154(b) by 72 days.

(21) Appl. No.: 10/676,935

(22) Filed: Oct. 1, 2003

(65) Prior Publication Data

US 2004/0104721 A1   Jun. 3, 2004

Related U.S. Application Data

(60) Provisional application No. 60/415,031, filed on Oct. 1, 2002.

(51) Int. Cl.
*G01R 35/00* (2006.01)
(52) U.S. Cl. ...................... 702/108; 702/115
(58) Field of Classification Search ............... 702/66, 702/67, 69, 79, 83, 108, 115, 124–126; 324/210, 324/211, 212; 360/31, 53, 313; 369/53.35, 369/53.44, 69
See application file for complete search history.

(56) References Cited

U.S. PATENT DOCUMENTS 5,677,802 A * 10/1997 Saiki et al. .................... 360/51
6,700,369 B1 * 3/2004 Makuuchi et al. .......... 324/212

* cited by examiner

*Primary Examiner*—Bryan Bui
(74) *Attorney, Agent, or Firm*—Greer, Burns, Crain, Ltd.

(57) ABSTRACT

A magnetic head testing apparatus includes reference information storing unit for holding a predetermined reference sampling period and a number of reference samplings, sampling unit for sampling reproduced data read a plurality of times from a magnetic medium in the reference sampling period, sampling number acquiring unit for acquiring a sampling number of measured data from a reproduced data base on a sampling result, sampling number ratio calculating unit for calculating a ratio of the sampling number of the measured data and the number of reference samplings, sampling data re-acquiring unit for changing the sampling period of the measured data depending on the calculated ratio and re-acquiring the sampling data and a measured data overlap-displaying unit for overlap-display of the sampling data re-acquired from the measured data a plurality of times.

5 Claims, 10 Drawing Sheets

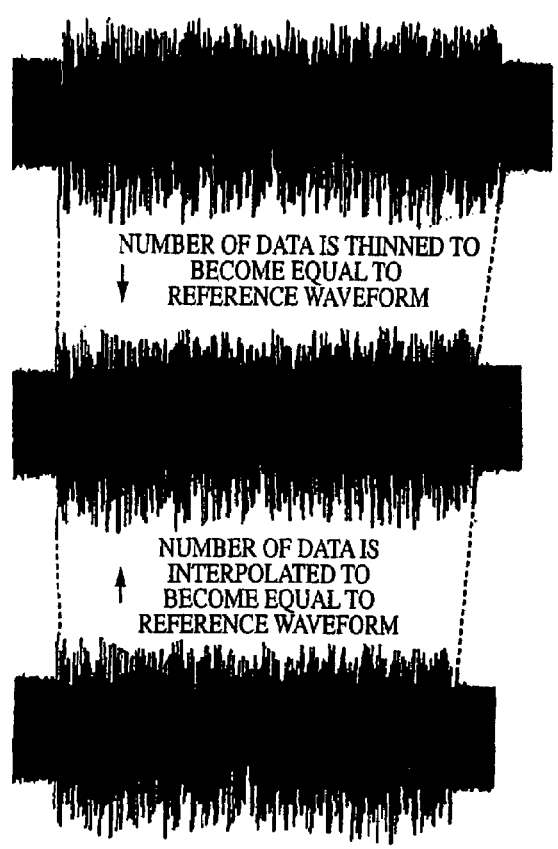
FIG. 6(a) NUMBER OF DATA IS LARGER THAN REFERENCE WAVEFORM
FIG. 6(b) REFERENCE (IDEAL) WAVEFORM
FIG. 6(c) NUMBER OF DATA IS SMALLER THAN REFERENCE WAVEFORM

MAGNETIC HEAD TESTING APPARATUS

This is a Continuation of Provisional Patent Application No. 60/415,031, filed Oct. 1, 2002.

BACKGROUND OF THE INVENTION

1. Field of the Invention

The present invention relates to magnetic head inspecting apparatuses, and more particularly to magnetic head apparatuses for testing a magnetic head loaded to a magnetic disk apparatus.

2. Description of the Related Art

In recent years, further improvements in recording density, high speed transfer of data, and high-speed rotation of spindles have been required for magnetic disk apparatuses. To attain such requirements, a Magnetic Resistive (MR) head has been used which can obtain a reproduced signal of high output level, without relation to the number of rotations (circumference speed) of a disk medium. A signal recording system for such magnetic disk apparatuses has been mainly based on the Partial Response Maximum Likelihood (PRML) technique, however, a fluctuation of signal levels has been shown to increase considerably using this technique progress in disk recording density. Recently, to account for this fluctuation, data has been conventionally read through an error correction method which utilizes a Maximum Likelihood (ML) process. When sufficient performance cannot be obtained by testing and evaluating with the magnetic head testing apparatus whether the MR head has an expected reproducing performance, investigation should be performed to analyze and pursue causes.

Known magnetic head testing apparatuses, however, experience problems with the amount of time required for investigative testing. Longer times are required for the testing work because signal waveforms of the magnetic head are displayed for a visual check and analysis of the waveforms by inputting the reproduced signal of the MR head to a measuring instrument such as an oscilloscope or the like.

Moreover, since the waveform read-out includes electronic noise, which can randomly change during any reading, and a medium noise, which can randomly change during any writing, it is difficult to observe how well the magnetic head has performed a writing. Additionally, the waveforms often lose their phase characteristics, and therefore it has also been impossible to observe overlap of a plurality of waveforms.

SUMMARY OF THE INVENTION

The present invention therefore enables acquisition of the MR head characteristics and easier data analysis by comparing many signal waveforms through an overlap-display thereof, but avoiding noise signals, which can change when observed.

Furthermore, the present invention improves accuracy of overlap through amplitude compensation and phase compensation when the waveforms are overlapped, and thereby calculates a Viterbi Metric Margin (VMM) value to analyze the MR head in detail.

The present invention has a structure which includes a reference information storing means for holding a predetermined reference sampling period and reference number of samplings, a sampling means for sampling reproduced data read out a plurality of times from a magnetic medium in a reference sampling period, a sampling number acquiring means for obtaining a sampling number of measured data from the reproduced data based on a result of sampling, a sampling number ratio calculating means for calculating a ratio of the sampling number of the measured data and a reference sampling number, a sampling data re-acquiring means for changing the sampling period of the measured data and re-acquiring the sampling data depending on the calculated ratio, and a measured data overlap-displaying means for overlap-displaying the sampling data re-acquired from a plurality of measured data.

According to this structure, the measured data of the reproduced data (which consists of preamble, measured data, and postamble, etc.) that is read out a plurality of times may change due to fluctuation of a disk rotation, but is matched with the reference sampling number based on the same calculated ratio in comparison with the reference sampling number. As a result, since the measured data, which is measured of a plurality of times, can be overlapped in a same reference. Therefore, the characteristic of the MR head can be more easily confirmed.

In a preferred structure of the present invention, the sampling number acquiring means has a structure which includes an average value of difference of peak phases of preamble and postamble from reproduced data having preamble, measured data, and postamble, a phase acquiring means for acquiring a peak phase obtained from an acquired average value, and preamble in which the square sum of phase difference of postamble from each peak phase and postamble phase, a re-sampling period acquiring means for acquiring a re-sampling period from a phase difference between the acquired preamble and postamble, and a predetermined number of bits therebetween, a measured data phase difference acquiring means for determining a data start phase and a data end phase of the measured data from the acquired sampling period, and then acquiring a phase difference thereof, and a sampling number calculating means for calculating a sampling number of the measured data from the acquired phase difference.

Since frequency fluctuations in the preamble and postamble can be approximated to an average value of each phase difference according to this preferred structure, accuracy of the phase matching of a plurality of measured data can be improved.

The magnetic head testing apparatus of the present invention may further preferably include means for storing, as an amplitude compensation coefficient, a value obtained by dividing a calculated average value of levels at each bit position with an expected value, in order to set an amplitude at each bit position of PR4 equalization to an expected value at a time of re-compensation of the reference phase position in the preamble part and postamble part, and for conducting the amplitude compensation by multiplying the amplitude compensation coefficient with the data at a time of setting a time axis to a time axis of the reference waveform data, a means for obtaining errors from the expected value for each bit and conducting phase matching by obtaining an average of many bits of preceding and succeeding bits, and a means for calculating and storing a VMM at the time of PRML process.

According to this preferred structure, variation of period in the preamble and postamble can be approximated to an average value of phase differences, and the amplitude can be set to an optimum value. Accordingly, accuracy of phase matching of a plurality of measured data can also be improved. Moreover, the MR head can be analyzed in greater detail by calculating the VMM value.

BRIEF DESCRIPTION OF THE DRAWINGS

FIGS. 6(a), 6(b), and 6(c) illustrate phase matching according to an embodiment of the present invention.

DETAILED DESCRIPTION OF THE INVENTION

Figure 1:
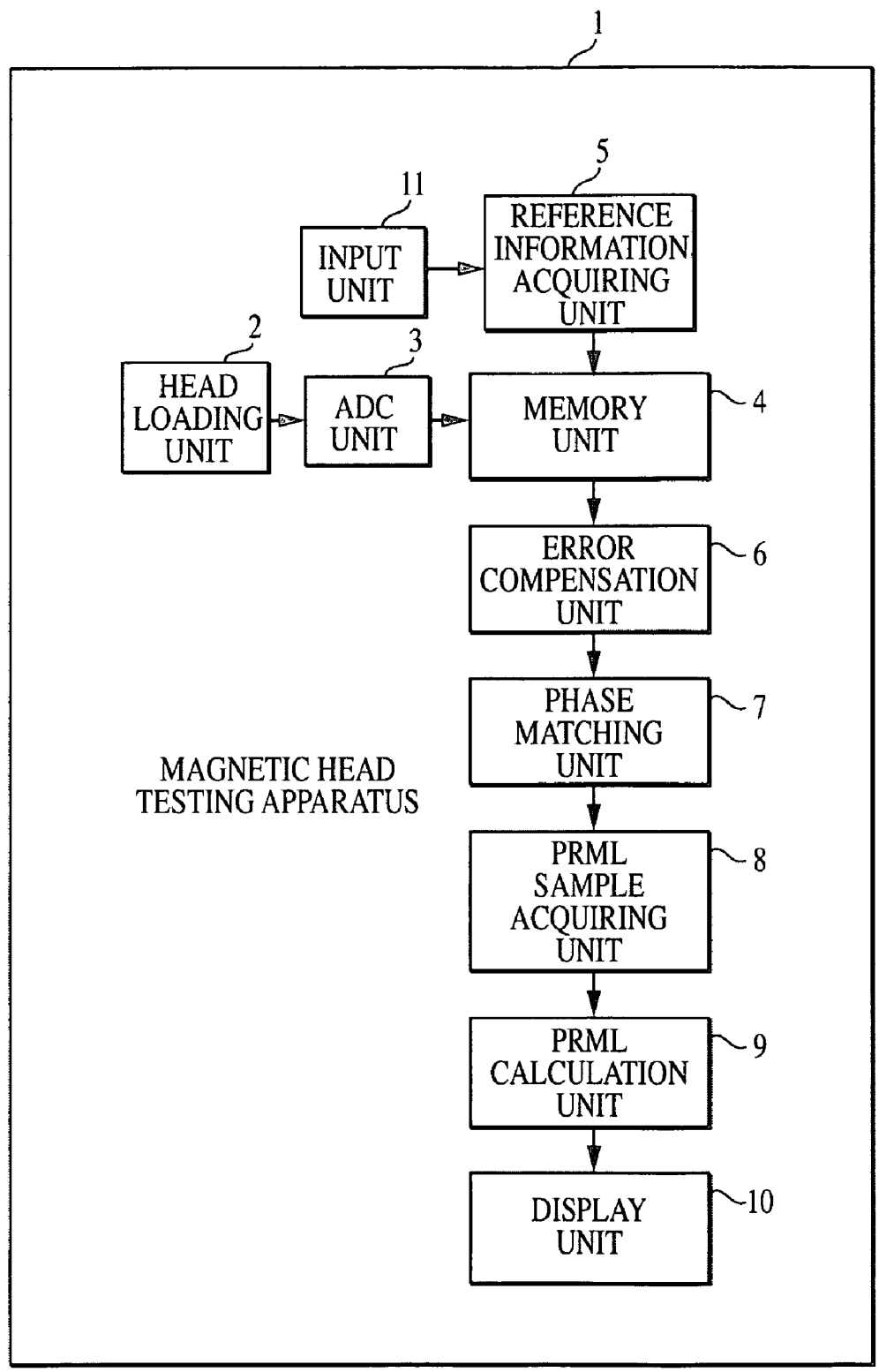
FIG. 1 is a structural diagram of a magnetic head testing apparatus according to one embodiment of the present invention.

FIG. 1 illustrates a structure of a magnetic head testing apparatus according to a first embodiment of the present invention. A magnetic head testing apparatus 1 includes a head loading unit 2 for loading an MR head (not numbered) for testing, an analog-digital converter (ADC) unit 3 for converting an analog signal to digital data, a memory unit 4 for storing the converted digital data, a reference information acquiring unit 5 for acquiring a reference sample period and reference sampling number, an error compensating unit 6 for phase compensation of fluctuation error of measured data, a phase matching unit 7 for matching the measured data to a phase of the reference waveform data, a PRML sample acquiring unit 8 for acquiring a PRML sample, a PRML calculating unit 9 for calculating the PRML sample, a display unit 10 for overlap-display of data based on sampling data or the like, and an input unit 11 for inputting reference information.

Figure 2:
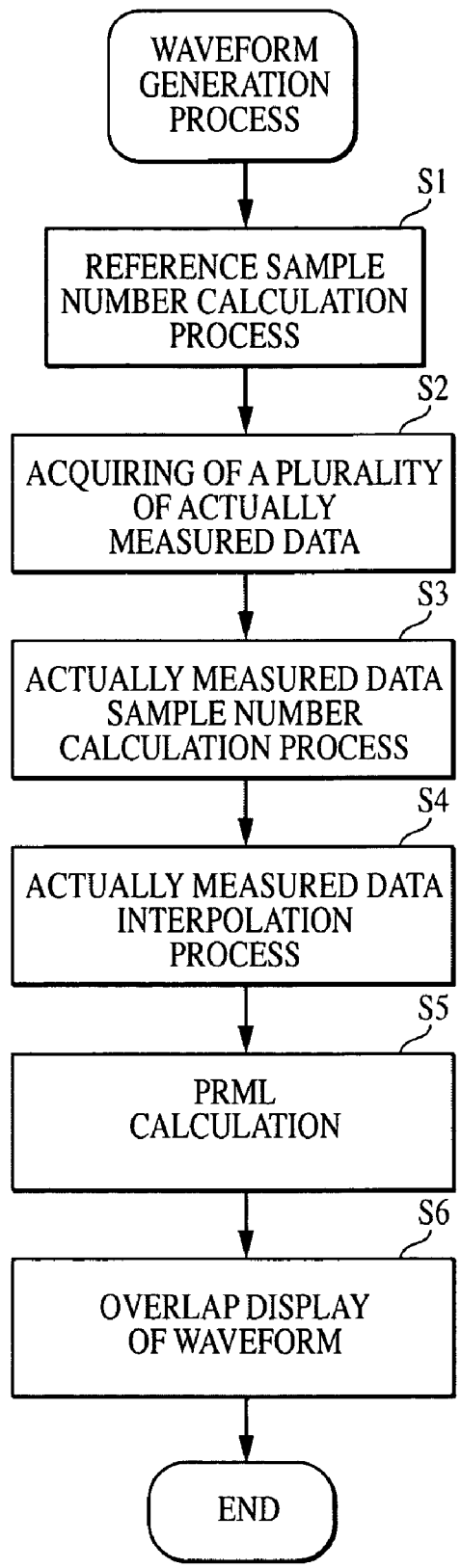
FIG. 2 is a flow diagram of the processes in the magnetic head testing apparatus according to one embodiment of the present invention.
Figure 3:
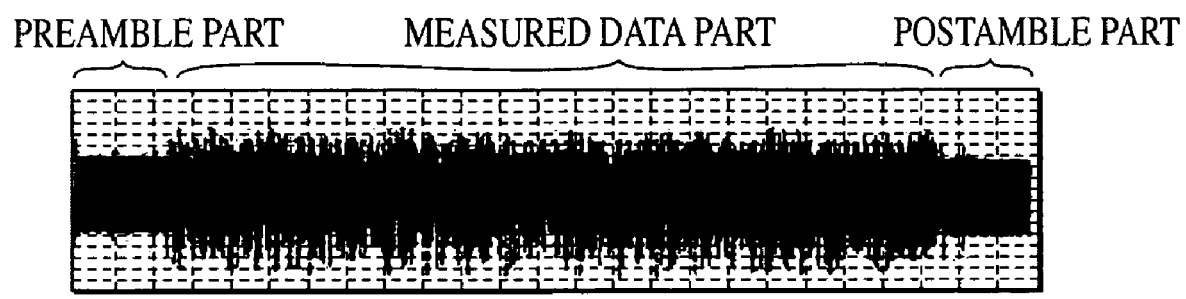
FIG. 3 is a data format diagram according to one embodiment of the present invention.

Referring now to FIGS. 2 and 3, a data format on a magnetic disk medium includes a preamble part for waveform phase matching and timing calculation, a postamble part and a measured data part. The postamble may also be included with the measured data part.

The preamble part is preferably a pattern having a constant period and is used, under ordinary hard disk drive (HDD) operation, for the automatic gain control (AGC) and detection of PRML bit sampling timing. The measured data part is provided to actually measure head signal quality. A random pattern of 4096 bits is preferably used, in general. Additionally, the postamble part is provided for realizing a matching in timing of the measured data part in combination with the preamble part.

As best seen in FIG. 2, the reference sample number calculation process (step S1) is first executed. Since frequency data, when half (½) of the maximum frequency of a magnetic head as the measurement object is set as the reference waveform data of preamble and postamble, is input from the input unit 11, the reference information acquiring unit 5 calculates the bit period per bit based on the input frequency. In such a case, when the reference sampling period can be assumed to be 0.1 ns, for example, the bit period is obtained as an integer value in units of 0.1 ns. For this example, when the frequency of reference waveform data is 250 MHz, a period can be obtained as 4.0 ns. Additionally, the bit period can also be obtained as 10 (0.1 ns/bit), because the level at the identifying point data depending on the PR4 characteristic becomes four bits of the pattern (1, 1, −1, −1). This bit period is called the basic bit sampling interval.

Next, the first bit of the measured data part is set as the starting reference phase, and the total number of bits up to the final bit of the measured data part from the first bit (for example, 4096 bits) is input.

The time of the measured data part is calculated from the number of input bits and the bit period also obtained by calculation. The number of the reference samplings (X0) of the measured data part may also be calculated from the total number of bits of the measured data part and the basic bit sampling interval (for example, 4096 bits×10=10960 pcs).

Next, the actual magnetic head and the magnetic disk medium in which data have been previously written are loaded to the magnetic head testing apparatus 1, and the measurement is thereafter started. First, reproduced data is obtained a plurality of times through the actual measurement of a same sector (for example, 4096 bits) (step S2). In this example, the data sampled in the predetermined period is acquired in the ADC unit 3, and then stored to the memory unit 4.

Figure 4A:
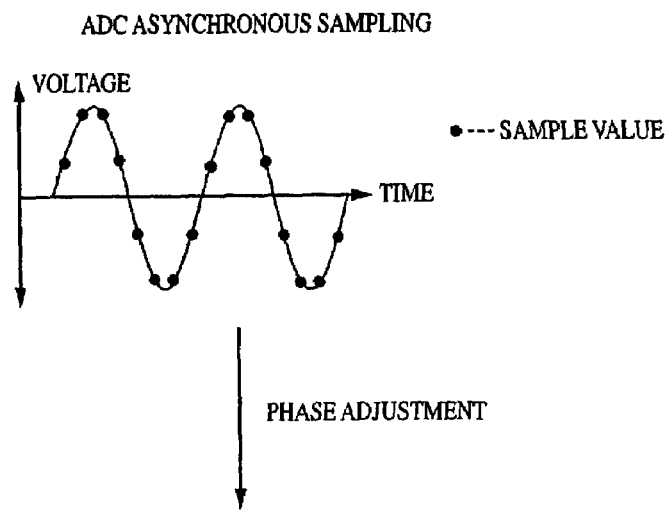
FIGS. 4(a) and 4(b) illustrate ADC samples according to one embodiment of the present invention.

As best illustrated in FIG. 4(a), a frequency of write pattern is asynchronous with an ADS sampling rate, and the data within the memory unit 4 is not fixed to a particular position within the frequency signal. Moreover, number sampling data changes a plurality of times of re-read operation with an influence of fluctuation generated during rotation of the disk itself.

Figure 5A:
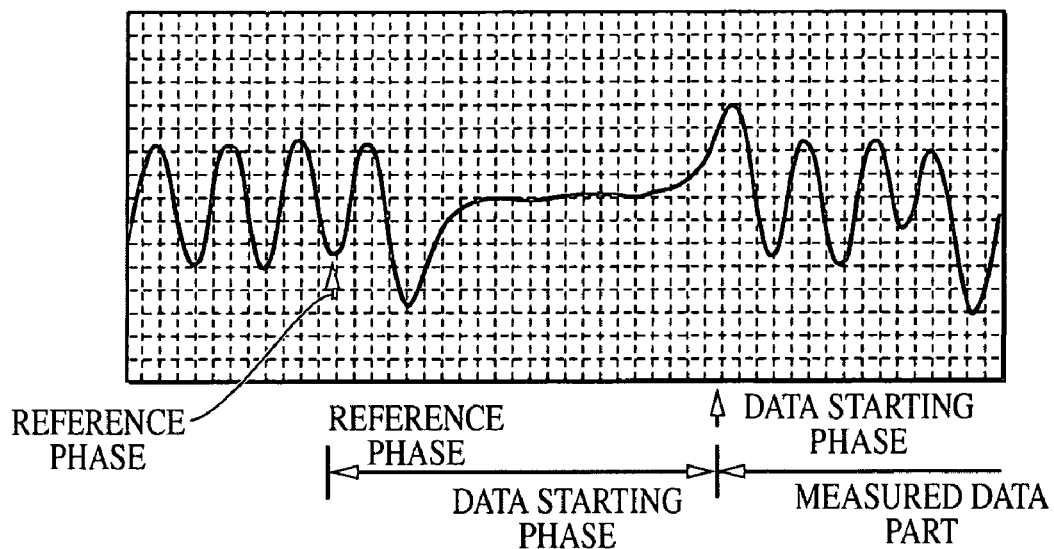
FIGS. 5(a) and 5(b) illustrate a data starting phase and a data ending phase according to an embodiment of the present invention.
Figure 5B:
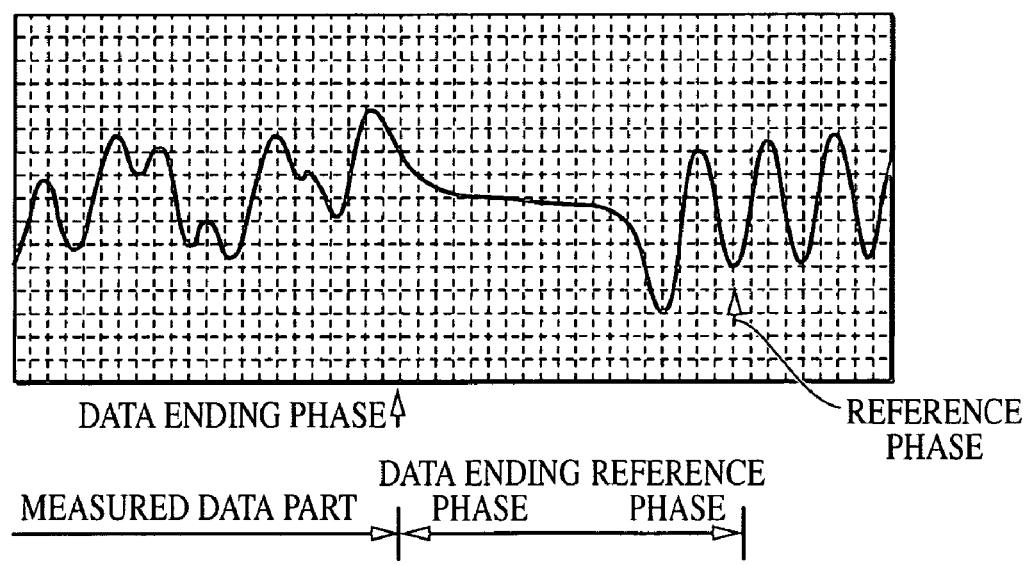

Referring now to FIGS. 5(a) and 5(b), the number of actually measured data samplings is calculated (step S3). First, the error compensation unit 6 acquires, as a reference phase, the position of the second to last peak phase of the preamble of the actually measured data and the position of the second peak phase of the postamble thereof from the memory unit 4.

Next, a difference between the peak phases is accumulated respectively for rising and falling portions of the postamble, and an average peak phase difference value of these portions is obtained by the calculation. Then, while the phase is shifted by a step of 0.01 ns, a difference between the peak value calculated from the average value of the differences between the actual peak phase and the calculated peak phases is calculated to obtain the phase which provides the smallest square sum thereof. The reference phase position of postamble is then compensated again from the phase obtained.

Next, a difference between peak phases is accumulated respectively for the rising and falling portions of the preamble, and a difference between the average peak phases is obtained by the calculation. Next, while the phase is shifted by a step of 0.01 ns, a difference between the peak phase calculated from the actual peak phase and the average value of the calculated differences between the peak phases is calculated to obtain a phase which provides the smallest square sum thereof. The reference phase position of the preamble is then compensated again from the phase obtained.

Next, a time difference T1 (in ns) of the reference phases of the preamble and postamble obtained is also obtained by calculation. A temporary bit sampling period is also calculated from time of phase difference and a known number of data bits included at this time:

Temporary Bit Sampling Period=$T1(ns)$/Number of Data Bits

Then, for the preamble part and postamble part, an expected value at a bit position in the PR4 equalization is obtained. While a difference between the expected value and the actual value is calculated and the phase is shifted by a step of 0.01 ns, a phase which provides the smallest square sum thereof is obtained to again compensate reference phase positions of the preamble and postamble.

A phase difference between the reference phase and the data starting phase is calculated based on the known number of bits between the reference phase and data starting phase and the temporary bit sampling period. The data starting phase position is determined from the phase difference. In the same manner, the data ending phase position can also be determined.

Next, a time difference T2 (ns) between a calculated data starting phase and a data ending phase is obtained. A number of samplings Xn is then obtained from the reference sampling period. Here, Xn=T2 (ns)/Reference Sampling Period. Then, the interpolation process of the actually measured data is executed (step S4).

Referring now to FIGS. 6(a), 6(b), and 6(c), first the phase matching unit 7 conducts compensation for matching the time axis with the time axis of the reference waveform data. The time axis after the compensation becomes m*Xn/X0 (m=0, 1, 2, 3, ... X0-1). Thereby, the number of sampling data becomes identical.

Moreover, the waveform data of the actually measured data is expressed with the following aggregation:

$Wn[0*Xn/X0], Wn[1*Xn/X0], Wn[2*Xn/X0], ..., Wn[(X0-1)*Xn/X0]$

In this example, since there is no data corresponding to the time axis other than integers, data before and after such data is linearly interpolated, and data corresponding to the time axis is calculated as explained below. Also in this example, linear interpolation is executed, but other compensating methods known in the art may also be used.

Figure 7:
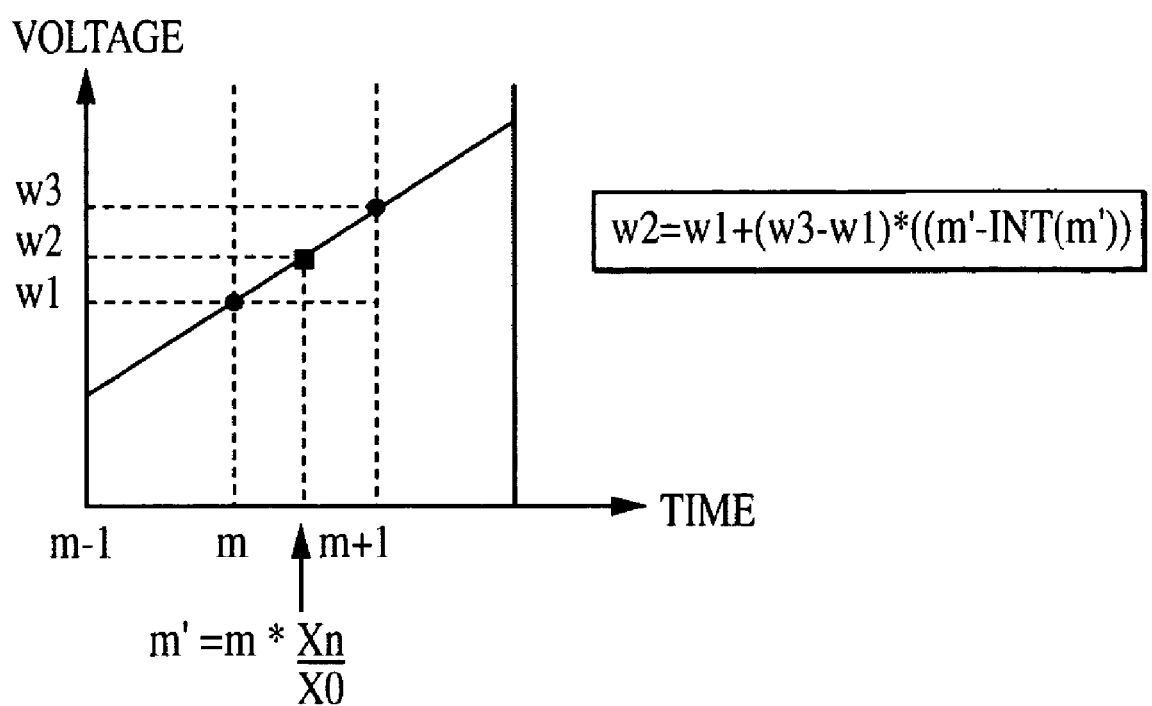
FIG. 7 illustrates an interpolation process according to an embodiment of the present invention.

Referring now to FIG. 7, when there is m*Xn/X0 (hereinafter referred to as m') between the basic sampling times m and m+1, an output Wn'[m] can be expressed by the following equation (INT means an integer):

$Wn'[m]=Wn[INT(m')]+\{Wn[INT(m')+1]-Wn[INT(m')]\}*\{m'-[INT(m')]\}$

In the example shown in FIG. 7, W1=Wn[INT(m')] and W3=Wn[INT(m')+1] are data obtained in the ADC sampling period when the measured data is read. Therefore, since (W2-W1) can be obtained by multiplying a difference (W3-W1) with a ratio of (m'-INT(m')), a value of W2 can be obtained by adding W1 to such difference (W2-W1). A data train can be obtained by repeating such calculation.

Figure 4B:
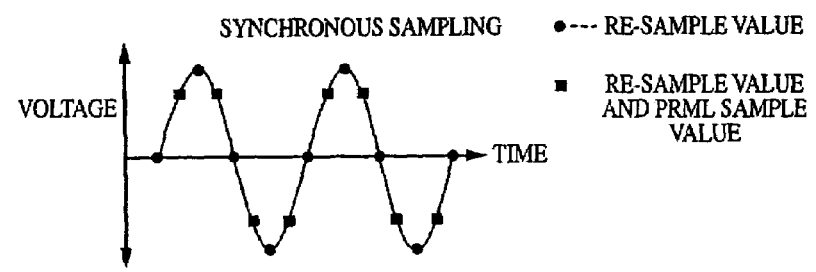

Next, since data is synchronized to a PRML sample, sampling is executed in a basic bit sampling interval which is equal to the PRML sampling period. An example of the phase-matched waveform is also illustrated in FIG. 4(b). As explained above, the head signal between the PRML samples can be compared quickly and easily. As seen in FIG. 2, the PRML sample is then processed in the PRML calculation unit 9 (step S5). The data in the memory unit 4 is then overlap-displayed on the display unit 10. (Step S6)

Figure 8:
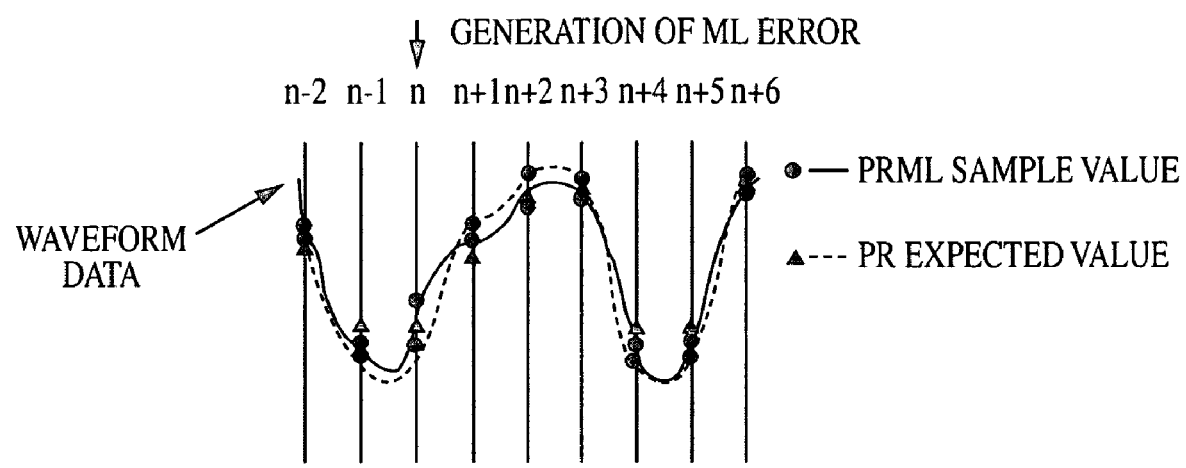
FIG. 8 illustrates waveform overlap in an embodiment of the present invention.

Referring now to FIG. 8, on the occasion of observing overlap of waveforms in the measurement of a plurality of times, waveform data, expected PRML values, and ML calculation results can be obtained quickly, and can also be written to overlap in the same graph. An ML error is generated at the PRML sample timing n, as an example in FIG. 8. As a result, since fluctuation of output of the MR head can be observed from the displayed contents, it is easier to search for the cause of error, or the like.

Figure 9:
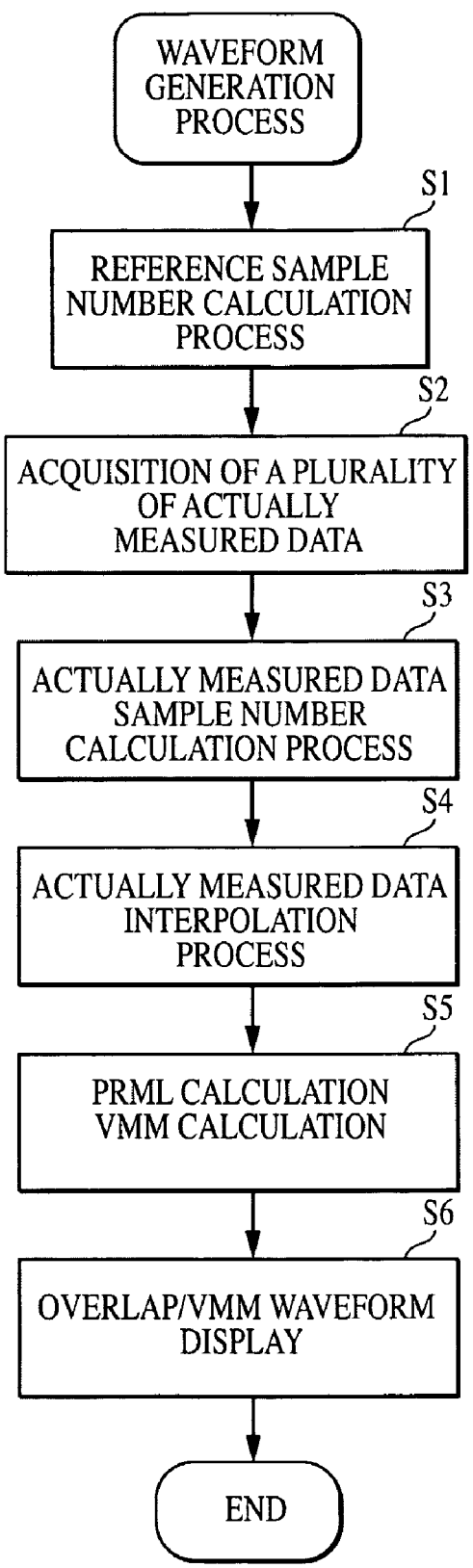
FIG. 9 is a flow diagram of processes in the magnetic head testing apparatus according to another embodiment of the present invention.

Referring now to FIG. 9, step S1 and step S2 are identical to the steps S1 and S2 shown in FIG. 2. In the next step S3, however, at the time of re-compensation of the reference phase position of the preamble and postamble, a value, obtained by dividing the calculated average value of levels at each bit position with the expected value, is stored as an amplitude compensation coefficient in order to set the amplitude at the bit position in the PR4 equalization to the expected value.

In the next step S4, at a time of conducting the interpolation process of the actually measured data, amplitude compensation is conducted by multiplying an obtained data train with the compensation coefficient calculated in step S4. Moreover, an error of the expected value for every bit can be obtained simultaneously, and an average value of many preceding and succeeding bits can also be obtained for every bit for phase matching.

Next, the PRML sample is processed in the PRML calculation unit 9 (step S5). In this timing, the VMM calculation process is conducted. Moreover, the waveforms are overlap-displayed on the display unit 10 based on the data of the memory unit 4 (step S6). Here, the VMM value calculated in the step S5 can also be displayed.

Figure 10:
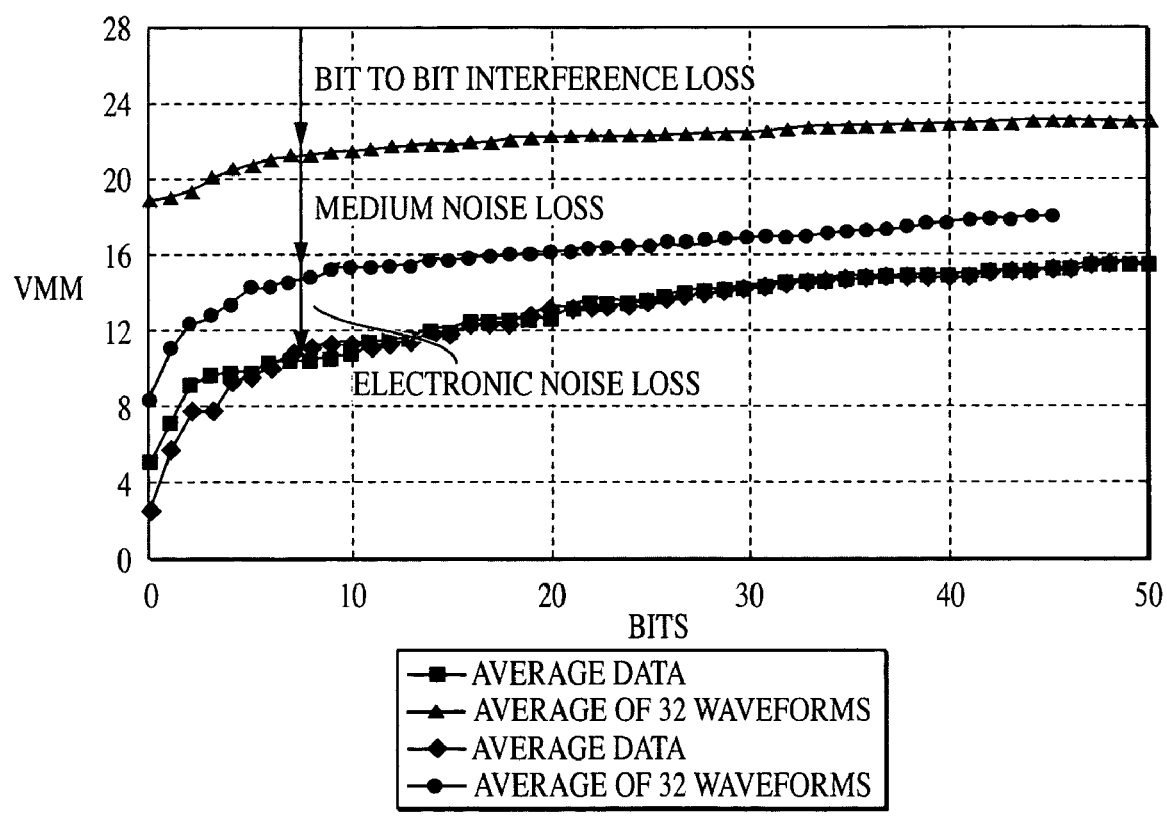
FIG. 10 illustrates the VMM according to another embodiment of the present invention.

FIG. 10 is a graph for explaining VMM of the embodiment shown in FIG. 9. The VMM value indicates, for each bit, "a difference between the assumed probability for the bit to become 1 and the assumed probability for the bit to become 0." A small difference means that a discrimination margin is small. According to this embodiment of the present invention, this VMM value can be calculated in the PRML process, and can also be stored. As illustrated in FIG. 10, 50 bits are sequentially extracted from those having small values, and then rearranged. Namely, 32 bits are measured on the magnetic disk, and the measurements have been conducted for only one bit. The average values of these bit measurements are obtained and the average data is also indicated. In this embodiment, the possibility of error may be more readily known, and analysis of the MR head can also be more easily realized.

The present invention assures that an overlap display of signal waveforms can be obtained a plurality of times, that characteristic fluctuation of the MR head element can be judged immediately, and that a signal quality of the head signal can also be evaluated quickly. Additionally, the VMM value in the present invention can also be displayed. Therefore, characteristic fluctuation of the MR head element can be thus judged at a glance, and the quality of the head signal can be quickly evaluated.

The invention claimed is:
1. A magnetic head testing apparatus, comprising:
reference information storing means for holding a predetermined reference sampling period and a reference number of samplings;
sampling means for sampling reproduced data read out a plurality of times from a magnetic medium in said predetermined reference sampling period;

sampling number acquiring means for obtaining a sampling number of measured data from said reproduced data based on a result of sampling;

sampling number ratio calculating means for calculating a ratio of said sampling number of said measured data and a reference sampling number;

sampling data re-acquiring means for changing said sampling period of said measured data and re-acquiring sampling data depending on said calculated ratio; and measured data overlap-displaying means for overlap-displaying said sampling data re-acquired from a plural of measured data, wherein said sampling number acquiring means further includes average value acquiring means for obtaining each average value of a difference between peak phases of preamble and postamble from said reproduced data having preamble, measured data, and postamble.

2. The magnetic head testing apparatus according to claim 1, further comprising means for storing as an amplitude compensation coefficient a value obtained by dividing a calculated average value of levels at each bit position with an expected value, in order to set an amplitude at each said bit position of PR4 equalization to an expected value at a time of re-compensation of a reference phase position in a preamble part and postamble part, and for conducting an amplitude compensation by multiplying said amplitude compensation coefficient to data at a time of setting a first time axis to a second time axis of a reference waveform data.

3. The magnetic head testing apparatus according to claim 2, further comprising means for obtaining errors from an expected value for said each bit at said time of re-compensation of said reference phase position in said preamble part and post-amble part, and means for conducting phase matching by obtaining an average of many bits of preceding and succeeding bits in the magnetic head testing apparatus.

4. The magnetic head testing apparatus according to claim 2, further comprising means for calculating and storing a Viterbi Metric Margin at a time of PRML process in said magnetic head testing apparatus.

5. A method of testing a magnetic head, comprising the steps of:

holding a predetermined reference sampling period and a reference number of samplings;

sampling reproduced data read out a plurality of times from a magnetic medium in said predetermined reference sampling period;

acquiring a sampling number of measured data from said reproduced data based on a result of sampling, said sampling number being acquired by obtaining each average value of a difference between peak phases of preamble and post-amble from said reproduced data having preamble, measured data, and post-amble;

calculating a ratio of said sampling number of said measured data and a reference sampling number;

re-acquiring sampling data depending on said calculated ratio and changing said sampling period of said measured data; and overlap-displaying said sampling data re-acquired from a plurality of measured data.

* * * * *

UNITED STATES PATENT AND TRADEMARK OFFICE
CERTIFICATE OF CORRECTION

| | |
|---|---|
| PATENT NO. | : 7,085,666 B2 |
| APPLICATION NO. | : 10/676935 |
| DATED | : August 1, 2006 |
| INVENTOR(S) | : Aratani et al. |

Page 1 of 1

It is certified that error appears in the above-identified patent and that said Letters Patent is hereby corrected as shown below:

<u>In the Claims</u>:

Col. 7, line 11, delete "plural" and insert --plurality--.

Signed and Sealed this

Nineteenth Day of December, 2006

JON W. DUDAS
*Director of the United States Patent and Trademark Office*